United States Patent Office 2,745,858
Patented May 15, 1956

2,745,858
PROCESS FOR RECOVERING PURE ZINC ETHIONATE

Frederick H. Norton, Concord, Calif., assignor to The Dow Chemical Company, Midland, Mich., a corporation of Delaware No Drawing. Application July 7, 1954,
Serial No. 441,945

2 Claims. (Cl. 260—429)

This invention relates to a method for obtaining pure zinc ethionate from mixtures of zinc ethionate with zinc hydroxide.

In concurrently filed applications Serial Nos. 441,943 and 441,944, the present inventor (and another) has shown that one method of recovering ethionine values from the solution obtained by hydrolysis of 5(2-ethyl-mercaptoethyl) hydantoin may involve the treatment of such a solution with a water-soluble zinc salt, in amount at least equivalent to the amount of ethionine present, and precipitating zinc ethionate from the solution at pH 6 to 7. Because of the difficulty of determining precisely the amount of ethionine present, and because it is uneconomical to leave recoverable ethionine in the solution, the common tendency is to use an excess of the zinc salt reagent, to be sure that as much as possible of the ethionine is precipitated as zinc ethionate. As a consequence of such practice, the zinc ethionate is coprecipitated with other zinc compounds, such as zinc hydroxide and the recovered precipitate may have far more than the theoretical 16.8 per cent of zinc.

For some uses of zinc ethionate it would be desirable to have a pure product. It is accordingly an object of the present invention to provide a method for recovering pure (over 99 per cent) zinc ethionate from a lower grade material which contains too much zinc.

The desired object is attained, according to the present invention, by redissolving in a strong acid a zinc ethionate containing too much zinc, and then carefully adjusting the pH of the solution, by the addition of an alkali metal hydroxide, to a value not less than 6.0 or more than 6.2. The zinc ethionate reprecipitates from the so-treated solution. No precipitation occurs below pH 6.0, and no zinc hydroxide precipitates until a pH of 6.2 is exceeded. In the range from 6.0 to 6.2, the precipitate is a very pure grade of zinc ethionate.

In a specific example, zinc ethionate was originally precipitated from a solution of unknown concentration of crude ethionine by the addition of what proved to be an excess of zinc chloride. The precipitate, after being washed with hot water and dried, had a zinc content of 25.6 per cent, instead of the theoretical value of 16.8 per cent. The impure zinc ethionate was mixed with 0.4 normal hydrochloric acid in a ratio of about 3 liters of the acid for each kilogram of the impure zinc ethionate. The solids were brought into solution by stirring and heating. The pH of the solution was below 2. Sodium hydroxide solution was added slowly, with stirring, until the pH of the aqueous medium was 6.0, whereupon the addition of alkali was stopped and precipitation occurred. The slurry was filtered and the recovered solids were washed with hot water until free from chlorides, and dried. There was obtained an amount of zinc ethionate equal to 74.5 per cent of the weight of the crude material subjected to treatment. If the original impurity is assumed to be only zinc hydroxide, this represents a recovery of over 91 per cent of the zinc ethionate from the impure product. The purified zinc ethionate was found to contain 16.9 per cent zinc and was at least 99.4 per cent pure.

The acid employed in the above example was hydrochloric acid, but any other strong acid may be used which forms water-soluble zinc salts.

I claim:
1. A method for the recovery of pure zinc ethionate from a lower grade of the same material containing zinc hydroxide as an impurity which comprises dissolving said lower grade material in a strong acid, adding an alkali metal hydroxide to the solution only until the pH of the medium is in the range from 6.0 to 6.2, and recovering the so-precipitated and purified zinc ethionate.

2. The method claimed in claim 1, wherein the acid employed is hydrochloric acid.

No references cited.